3,639,306
Patented Feb. 1, 1972

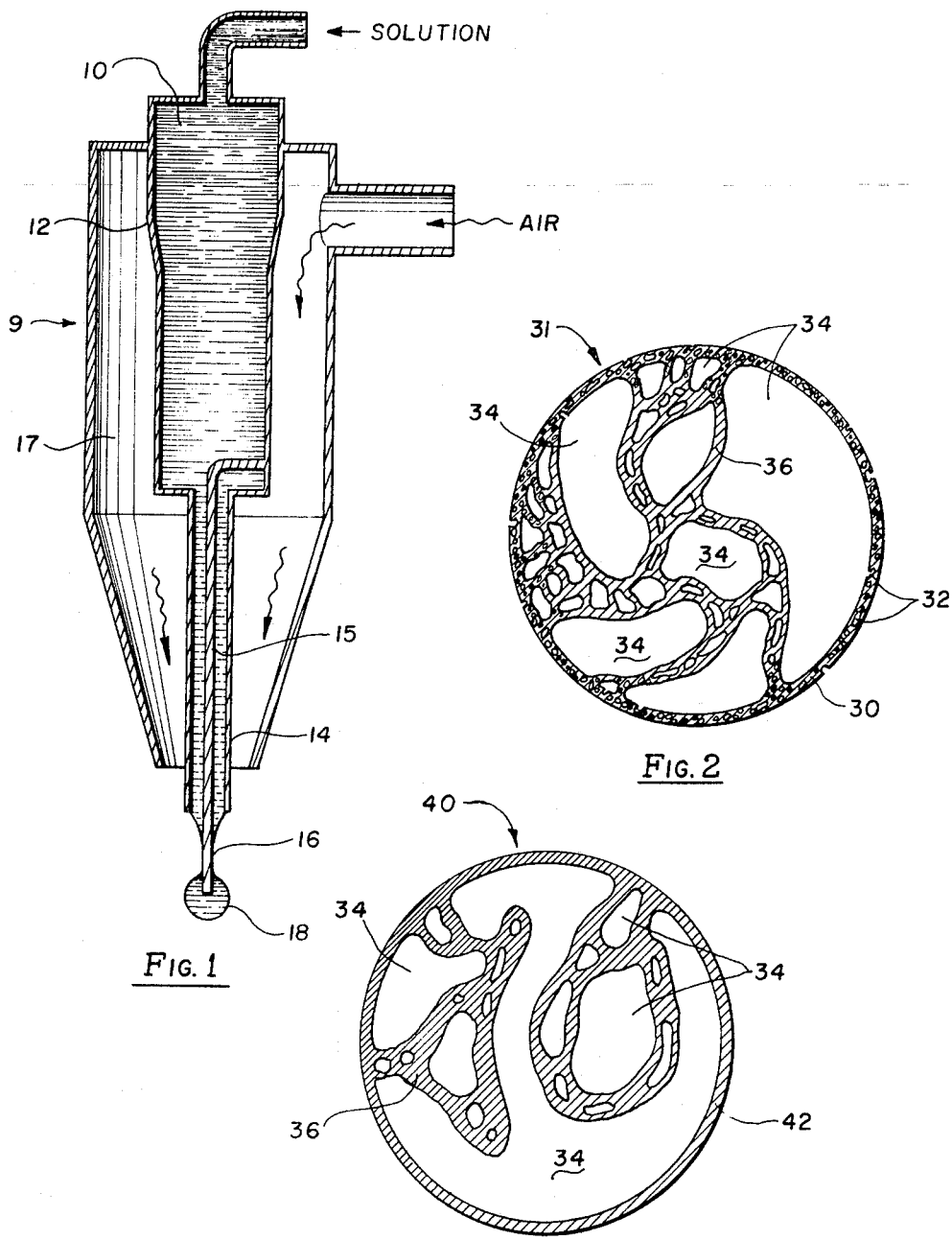

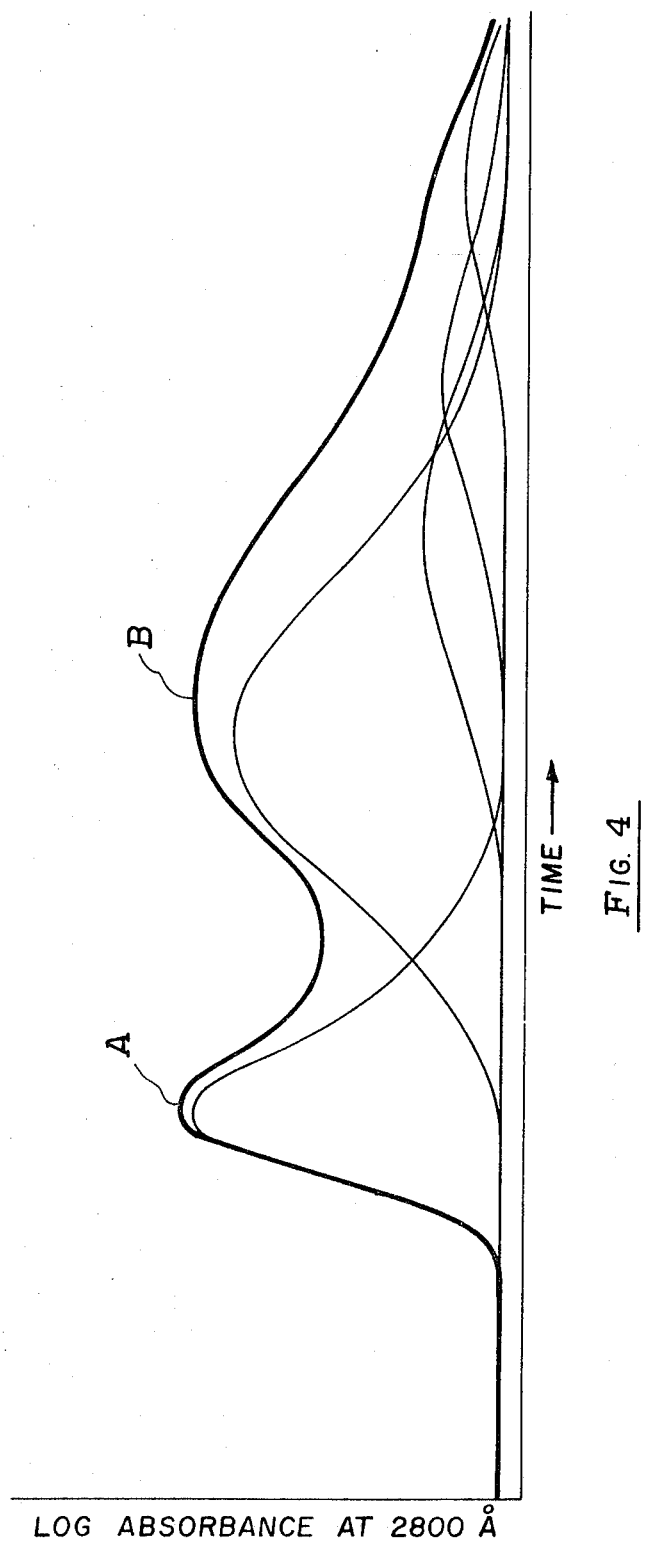

3,639,306
ENCAPSULATING PARTICLES AND PROCESS FOR MAKING SAME
Shmuel Sternberg, Hyde Park, and Harris J. Bixler and Alan S. Michaels, Lexington, Mass., assignors to Amicon Corporation, Lexington, Mass.
Filed Aug. 8, 1968, Ser. No. 751,251
Int. Cl. B01j *13/02;* C08j *1/28*
U.S. Cl. 260—2.5 B    20 Claims

ABSTRACT OF THE DISCLOSURE

Anisotropic polymer particles comprising a thin skin which forms either a microporous or diffusive barrier layer and a substantially hollow interior which interior, however, comprises sufficient macroporous polymer support structure to substantially enhance the physical strength, particularly the resistance to compression, of the particles. These particles have excellent utility for encapsulating various materials for controlled release therefrom, for immobilizing some chemical reactants while allowing free access and egress of other reactants or reaction products from the particle, and for effecting separations based on diffusion of different-size molecules therethrough. The versatile process by which these particles are formed is also a subject of the instant invention.

BACKGROUND OF THE INVENTION

There are a considerable number of existing and potential uses for substantially hollow particles which may be used to encapsulate a chemically-active agent and then release it either through the surface of the particles at a controlled rate or upon the rupture of the particle by the application of force thereto.

Among the "controlled-release" applications are those wherein such an active agent as a medicine, an insecticide, fragrances, pesticides, herbicides, fertilizers, etc. may be encapsulated and released over a prolonged period of time thereby achieving a more efficient and beneficial effect from the active agent. Also among such applications are those wherein the skin of the membrane acts as a microporous sieve for holding in or keeping out certain molecules on the basis of their size and shape factor.

Among the "rupture-release" applications are those wherein an active agent, such as inks like those materials used on "carbonless" carbon paper or curing agents such as those used with epoxy resin adhesives in industrial applications, are released spontaneously upon application of stress to the particle encapsulating the agent. In general, encapsulated agents are called "core materials" in this specification hereafter.

The art has for some time been in need of improved encapsulating materials and encapsulating processes. One problem with the prior art materials is their high fragility. For example although suitable materials have been made for use in processes where relatively light pressures are met during storage and handling prior to actual usage ("carbonless" carbon paper is an example), there is a need for encapsulating materials which are more highly resistant to physical abuse. Another problem in the art is that some materials which are presently used for some of these applications are very susceptible to swelling in many organic solvents and water. It is more desirable that any increase in resistance to destruction by physical abuse be accompanied by an increase in resistance to swelling in a variety of solvents.

It has also been desirable to provide small hollow microporous particles into which matter may pass, be retained therein for a particular purpose, and then pass therefrom at a controlled rate. In such cases the encapsulated agent, i.e. core material, may be a chemical reactant, a catalytic modifier, or a selective solvent which may act on a chemical compound entering the enclosed (encapsulated) volume in any of a number of ways. The core materials may modify it chemically (example: an enzyme too large to escape the capsule itself may modify another compound exposed to it in the capsule); it may retard it (example: a selective solvent will "hold," for a while, one component of a mixture while selectively rejecting the other. This type of procedure allows a kind of chromatographic separation of two materials having different affinities for the encapsulated solvent). Moreover, the mere fact of microporosity may be used to achieve a kind of separation of small from large molecules using such materials as relatively inexpensive molecular sieves.

SUMMARY OF THE INVENTION

Therefore, it is an object of the present invention to provide a novel encapsulating process and novel products produced thereby which products are characterized by excellent rate-of-release characteristics and excellent physical strength.

It is another object of the invention to provide novel microporous encapsulating particles which particles, by virtue of their microporous character, provide a control over the size and shape of molecules which enter and leave said encapsulating particles and over the rate at which various similar sized and shaped articles diffuse through the barrier layer thereof.

It is a further object of the invention to provide microreactors of high output capacity wherein at least one chemical reactant is entrapped within an encapsulating particle but wherein at least one other reactant and at least one product of the reaction may pass freely through the wall of said encapsulating particle, said free passage being either a consequence of the diffusive permeability or microporosity of said particle.

Another object of the invention is to provide novel processes and apparatus for making a large variety of encapsulating particles as those described above, said processes and apparatus being highly versatile and affording control means for achieving a large number of variations in the size, polymeric composition, and release characteristics of the products produced therewith.

Another object of the invention is to provide a novel separation process in the nature of a chromatographic separation.

Another object of the invention is to provide encapsulating particles which can be highly loaded with encapsulated material, advantageously to contain at least 50% but even as high as 90% by weight of said material, and to contain more than 25% by weight even at relatively low average diameter particle sizes such as those from 10 to 1000 microns.

Another object of the invention is to provide encapsulating particles which are, even when containing encapsulated liquids, dry and free flowing.

Still another object of the invention is to provide a process whereby particles having good resistance to compaction also have good resistance to swelling in solvents.

A further object of the invention is to provide encapsulating particles which, taken in bulk, contain less than about 1.0 weight percent of free (non-encapsulated) core material.

Still another object of the invention is to provide a process by which encapsulating particles may be prepared without incorporating therewith any foreign ingredients which may deleteriously alter the properties of the particles from those of which form the organic polymer of choice.

Another object of the invention is to provide a process whereby a large number of core materials can be incorporated into particles without deleterious effects on such materials.

Other objects of the invention will be obvious to those skilled in the art on reading the instant specification.

The above objects have been substantially achieved by forming droplets of selected polymer solutions under such conditions as will yield the desired particle size, immersing these droplets into a selected liquid diluent and thereby forming a small particle which, rather than being classically hollow, comprises in the interior portions thereof a sponge of macroporous support structure. This macroporous structure, although taking so little volume that the free-volume available for holding a core material remains very high, provides good support for the particle avoiding premature destruction or squeezing-out of core material. Moreover, the macroporous support structure is integral, i.e. in continuous phase, with the microporous outer barrier layer.

By proper selection of process reactants and conditions, it has been found that the outer barrier layer of the particle may have a pre-selected degree of permeability (or microporosity) as appropriate for the particular application for which the particle is intended. Another important aspect of the particles of the invention—indeed one which makes it practical for such beads to be used in many separation processes—is in fact that the transition between the microporous and macroporous sections of the particle (which may be considered in concentric relation to each other) takes place within extraordinarily small geometric space—usually within about 0.5 micron or less. Thus the particles do not act like easily-plugging depth-filters and have an acceptably useful life.

In effect then, particles formed according to the invention form a kind of particulate ultrafiltration membrane with the outer barrier skin being the "membrane" or separating screen and the inner macroporous layer serving the dual purpose of providing a reservoir for core material and providing good support against compression of the particle. Moreover, the sharp transition between macroporous and microporous layers together with the extreme thinness of the microporous layers allow very small particles to be prepared and thereby allow for larger effective filter areas to be put into a given volume than would otherwise be expected.

Particles of the invention have a highly anisotropic, submicroscopically porous barrier skin and are formed of organic film-forming polymers thaving good mechanical integrity, most advantageously those crystalline and/or glassy thermoplastic polymers known to the art. By crystalline and glassy polymers are meant those materials which possess from about 5 to 90% by weight crystallinity as measured by X-ray diffraction techniques known to the art and/or a glass transition temperature (Tg) of at least about 20° C. Particularly advantageous are polymers of inherently low water absorptivity, which may be allowed to dry during storage without destroying the beneficial mechanical and processing characteristics of the microporous barrier layer thereof. These particles do not necessarily depend upon any inherent water absorptivity of the polymer for their utility and many of the most desirable polymers are those having water-absorptivities of less than about 10% by weight of moisture at 25° C. and 100% relative humidity.

The internally-reinforced particles of the invention are prepared by:

(1) forming a solution of a polymer in an organic solvent
(2) forming drops of said solution
(3) contacting said drops with a diluent characterized by a high degree of miscibility with said organic solvent and a sufficiently low degree of compatibility with said casting dope to effect rapid precipitation of said polymer, and
(4) maintaining said diluent in contact with said particle until substantially all said solvent has been replaced with said diluent.

The submicroscopically porous anisotropic particles of this invention consist of macroscopically thick particles of porous polymer. The outer surface of this particle is an exceedingly thin, but relatively dense barrier layer of "skin" of from about 0.1 to 5.0 microns thickness of microporous polymer in which the average pore diameter is in the millimicron range, for example from 1.0 to 500 millimicrons—i.e., about one-tenth to one-hundredth the thickness of the skin. The balance of the particle structure includes a support structure comprised of a much more coarsely porous polymer structure through which fluid can pass with no significant increase in hydraulic resistance over that offered by the barrier layer. When such a particle is employed as a "molecular filter" in contact with fluid under pressure, virtually all resistance to fluid flow out of and into the particle is encountered in the "skin." Molecules or other dispersoids of dimensions larger than the pores in the "skin" can be retained within the particle structure. Because the barrier layer is of such extraordinary thinness, the over-all hydraulic resistance to fluid flow through the barrier skin is very low; that is, the skin displays surprisingly high permeability to fluids. Furthermore, tendency of the skin of such particles to become plugged or fouled by molecules or other dispersants is surprisingly low.

The discovery that such anisotropic membrane structures can be prepared in the form of particles by the precipitation and leaching of specially-formulated polymer solutions under controlled conditions is believed to be a consequence of unusual coaction of diffusion and polymer-precipitation phenomena which occur during a controlled leaching process.

However, it has been discovered that by proper selection of solvent and diluent, a variety of polymer-gel structures, of controllable porosity and pore-fineness can be prepared for a given polymer. In those instances where a single polymer solvent of the desired degree of polymer compatibility to achieve a desired gel-structure cannot be found, it is possible to employ mixtures of miscible solvents of differing compatibility with the polymer (both of which are miscible with the diluent) to achieve this purpose.

In order to obtain approximately spherical particles (as is usually preferable both from the point of view of obtaining particles having good packing quality for use in packed columns, good handling qualities, and barrier skins free from imperfections), it is desirable to introduce the droplet or polymer solution into the wash bath at a sufficient velocity to overcome the surface tension of the diluent. This precaution will avoid the flattening of the particles. Surfactants can be used to reduce the surface tension of the diluent and lessen the optimum impact velocity. Agitation of the diluent is desirable when the particles tend to float therein because substantially all the solvent must be removed from the particle to assure that it will not be softened by residual solvent on storage.

Internal structure of the spheres can be strongly affected by changes in temperature. When the temperature of the diluent bath is too high, as in a boiling water bath, an open central core or hollow section will usually be achieved within the macroporous support structure. In room-temperature water, the central core will be more spongelike in appearance.

Film-forming polymers useful in the invention include, but are not limited to, the following:

Polycarbonates, i.e. linear polyester of carbonic acids in which carbonate groups recur in the polymer chain, by phosgenation of a dihydroxy aromatic, such as bisphenol A. Such materials are sold under the trade designation Lexan by the General Electric Company.

Polyvinylchlorides; one such material is sold under the trade designation Geon 121 by B. F. Goodrich Chemical Company.

Polyamides such as polyhexamethylene adipamide and other such polyamides popularly known as "nylon."

Modacrylic copolymers, such as those sold under the trade designation Dynel and formed of polyvinyl chloride (60%) and acrylonitrile (40%), styrene-acrylic acid copolymers and the like.

Polysulfones such as those of the type characterized by diphenylene sulfone groups in the linear chain thereof are useful. Such materials are available from Union Carbide Corporation under the trade designation P-1700:

Halogenated polymers such as polyvinylidene fluoride sold under the trade designation Kynar by Pennsalt Chemical Corporation, polyvinylfluoride sold under the trade name Tedlar by E. I. du Pont de Nemours & Co., and the polyfluorohalocarbon sold under the trade name Aclar by Allied Chemical Corporation;

Polychloroethers such as that sold under the trade name Penton by Hercules Incorporated, and other such thermoplastic polyethers;

Acetal polymers such as the polyformaldehyde sold under the trade name Delrin by E. I. du Pont de Nemours & Co., and the like;

Acrylic resins such as polyacrylonitrile polymethyl methacrylate, poly n-butyl methacrylate and the like;

Other polymers such as polyurethanes, polyimides, polybenzimidazoles, polyvinyl acetate, aromatic and aliphatic polyethers, and the like may also be utilized.

The large number of copolymers, which can be formed by reacting various proportions of monomers from which the aforesaid list of polymers were synthesized, are also useful for preparing microporous particles according to the invention.

Perusal of the above illustrative list of polymers operable in the present invention will reveal that, as a general rule, relatively polar polymeric materials are preferred. This is true primarily because it is an easier task to select operable systems of non-hazardous solvents, co-solvents, and economical wash fluids when polar polymers are used. In general, non-polar polymers such as polyethylene require a more exotic system of solvents, and consequently are not as conveniently adapted for economic and safe operation of the process. Nevertheless, they can be utilized in practice of the invention when required to provide particles of particular characteristics.

In general, preferred polymers for embodiment in this invention are those which exhibit modest levels of crystallinity at ambient temperatures, e.g. between about 5% to 90% crystallinity as measured by X-ray diffraction analysis and/or those which display relatively high glass transition temperatures, (e.g., at least 20° C., and preferably higher). Polymers meeting these requirements, as a rule, yield particles with good mechanical strength, and good long-term stability at elevated temperatures.

The art provides a number of useful approaches to selection of particular solvent systems for particular polymers. The polymer Handbook edited by Brandrup and Immergut (John Wiley and Sons, New York, 1966) provides some especially helpful chapters. Particular attention is called to the chapters entitled "Solvents and Nonsolvents for Polymers" by Klaus Meyerson and "Solubility Parameter Values" by H. Burrell and B. Immergut in addition to the large quantity of other data contained in Section IV of this work. Further aid in selecting appropriate polymer-solvent mixtures is provided in the Journal of Paint Technology, volume 38, May 1966, by Crowley et al. in an article entitled "A Three-Dimensional Approach to Solubility" and in the Journal of Paint Technology, volume 39, No. 505, February 1967, by Hansen in an article entitled "The Three-Dimensional Solubility Parameter-Key to Paint Component Affinities."

Study of these references will inform one skilled in the art of numerous solvents which can be selected with a view to cohesive energy density (as defined by a so-called Solubility Parameter), hydrogen bonding tendency, and polarity for use with a given polymer system. In general it may be stated that the higher the solvency of a given system for a polymer, higher mass transport across the barrier layer will be attainable in particles formed from a polymer solution of given concentration.

Among the many specific polymer-solvent systems which applicant has found to be useful in forming particles according to the invention are the following:

| System No. | Polymer | Solvent |
|---|---|---|
| 1 | Acrylonitrile (40)-vinylchloride (60) copolymer (Dynel). | N,N'-dimethylformamide (DMF). |
| 2 | Acrylonitrile (40)-vinylchloride (60) copolymer. | Dimethylsulfoxide (DMSO). |
| 3 | Acrylonitrile (40)-vinylchloride (50) copolymer. | N-methyl-pyrrolidone. |
| 4 | Acrylonitrile (40)-vinylchloride (50) copolymer. | Dimethylacetamide (DMAC). |
| 5 | Polyacrylonitrile | DMF. |
| 6 | do | DMAC. |
| 7 | Polysulfone | N-methyl pyrrolidone. |
| 8 | do | N,N-dimethylpropionamide. |
| 9 | Polyvinylchloride | DMF. |
| 10 | do | DMAC. |
| 11 | Polyvinylidene chloride | DMF. |
| 12 | Polycarbonate | DMF. |
| 13 | Polystyrene | DMF. |
| 14 | Poly-butyl methacrylate | DMF. |
| 15 | Polymethylmethacrylate | DMF. |
| 16 | Polysulfone | Cyclohexanone. |
| 17 | Polymer 360 | DMAC. |
| 18 | do | DMF. |
| 19 | do | DMSO. |
| 20 | Polyacrylonitrile | 70% $ZnCl_2$ (aqueous). |
| 21 | Polycarbonate | DMSO. |
| 22 | do | DMAC. |
| 23 | do | Tetrahydrothiophene. |
| 24 | do | n-Butyrolactone. |
| 25 | do | N'N'-diethylformamide. |
| 26 | Polyvinylchloride | N'N-diethylpropionamide. |
| 27 | do | n-Butyrolactone. |
| 28 | Polymer 360 | Tetrahydrothiophene. |
| 29 | Dynel | Ethylene carbonate. |
| 30 | do | N'N'-diethylpropionamide. |
| 31 | do | Tetrahydrothiophene. |
| 32 | do | N'N'-diethylformamide. |

Other systems which can be utilized include such systems as nylon in solution with phenol, cresol, or formic acid, polyphenylene oxide in DMF polycarbonate in ethylene carbonate; polyvinyl fluoride in butyrolactone, polyurethane in DMAC.

Usually the pore-structure of the particles can be further modified by the addition of a "solution-modifier" and/or by further moderate increases in the temperature of the casting and wash operations, and/or by changes in polymer concentration in the casting dope.

Of course, when a particular core-material is added to the system for encapsulation into the particles formed therewith it becomes necessary to determine whether the substance to be encapsulated itself will interfere with the formation of a suitable polymer solution. For example, oil of wintergreen will interfere with the formation of a solution of polycarbonate in DMF, but allows suitable solutions to be formed between DMF and Dynel.

All of the above polymer-solvent systems yielded microporous support particles when precipitated in water diluent at a range of concentrations between 5 and 30% of polymer by weight.

The range of operable polymer concentrations for the polymer solution varies somewhat with the particular polymer solution being utilized and the degree of porosity required for a particular application. In using the Dynel-DMSO system, it has been found that 5% by weight solutions of polymer would form spheres in a water diluent, but on storage over a period of several hours the water became cloudy suggesting the deterioration of an excessively fragile solid structure. Spheres formed with 6% solutions did not exhibit this clouding effect.

Solution modifiers are often advantageously selected to increase the solvating effect on the polymer of the overall solvent system. The use of such a solution modifier will tend to loosen, the barrier skin, i.e., increase the size at which a molecule may enter and exit therethrough. By "increased solving effect" is meant an increase in compatibility or the degree of proximity to formation of an ideal solution.

Conversely, a solution-modifier which reduces the solvating effect of the overall solvent system tends to decrease the size at which a molecule may enter and exit therethrough.

To illustrate this with respect to making Dynel particles with water as the diluent and DMF as the primary solvent:

DMF has a Solubility Parameter (cal./cc.)$^{1/2}$ of 12.1 is a strong to medium hydrogen bonding solvent, and has a dipole moment of 2. Water has a Solubility Parameter of 23.4, is a strong hydrogen bonding solvent, and has a dipole moment of about 1.8.

Thus a solution modifier used in the process of the invention and having a Solubility Parameter of 10.0, medium hydrogen bonding tendency, and a dipole moment of 2.9 would be expected to decrease the solvating effect on Dynel and thus would tend to "tighten" the Dynel particle skin. Such is the case with acetone used as a solution modifier, for example in the quality of 5% based on weight of total solvent. Tetrahydrofurane is an example of another such modifier.

On the other hand, a solution modifier having about the same dipole moment as DMF and a strong affinity to water would function more like the $ZnCl_2$ type of inorganic salt to be discussed below, and has sufficiently greater compatibility with water than DMF to "loosen" the barrier skin, i.e., increase the mass transfer across the barrier skin under given conditions. Such is the case with formamide used as a "solution-modifier," for example in the quantity of 5% based on the weight of the total solvent. This is in spite of the fact that bare reference to the solubility parameter of formamide would lead one to believe that its use would result in a poorer solvent for Dynel and, consequently, a particle skin having smaller micropores.

In general, a large number of such solution modifiers can be selected for a given polymer-solvent system. The selection can be made, not only from the classical lists of organic solvents, but also from solid organic compounds which may be solubilized in the primary solvents.

Another class of solution modifiers are the inorganic electrolytes dissociable in organic solutions, for example many halides, nitrates and the like. Some such compounds are $FeCl_3$, $LiBr$, $LiCl$, $Al(NO_3)_3$, $Cu(NO_3)_2$ and $NaCNS$ and the like. These materials in solution, tend to have a solvating effect on polar polymers and tend to increase the flux rate attainable with particles formed of solutions in which they are incorporated as solution modifiers. Some such inorganic electrolyte solution modifiers particularly useful in the systems described in Table I include those exemplified by the list in Table II below.

TABLE II

| System | Solution modifier | System | Solution modifier |
|---|---|---|---|
| 1 | $ZnCl_2$ | 2 | $ZnCl_2$ |
| 1 | $FeCl_3$ | 4 | $LiNO_3$ |
| 1 | $LiBr$ | 6 | $LiCl$ |
| 1 | $Al(NO_3)_3$ | 11 | $ZnCl_2$ |
| 1 | $NaCNS$ | 12 | $ZnCl_2$ |
| 1 | $Cu(NO_3)_2$ | | |

The effect of these salts which act as solvating aids for polymers is usually the opposite when they are incorporated in the diluent.

Organic and other liquid solution modifiers particularly useful in the systems described in Table I include those exemplified by the list in Table III below.

Table III

| System: | Solution modifiers |
|---|---|
| 1 | Tartaric acid. |
| 1 | $H_2O$. |
| 1 | $HCONH_2$. |
| 1 | Dioxane. |

The diluent, as has been stated before, should be compatible with the solution modifier and primary solvent which form the total solvent systems to be leached from a cast bead. Water, the most convenient diluent will normally be utilized in all systems in which it is operable. Occasionally a mixture of water and an organic solvent will provide a more suitable diluent; in such cases the organic solvent can often be selected from the solution modifier or primary solvent or a mixture of the two. However, it is suggested that some polymer solutions such as those incorporating nylon, would be better washed with an organic solvent such as methanol, fusel oil, gasoline, or the like; while those incorporating polyvinyl chloride-dissolved in methyl isobutyl ketone could be washed with naphtha.

It is often possible, by means of a quick qualitative analytical test, to judge whether a particular diluent will be suitable for use with a particular polymer or polymer-core material solution: If the addition of a few drops of a prospective diluent to the solution brings about immediate precipitation of the polymer, good particles can generally be formed.

Polymer solutions are advantageously from about 50 to 500 cps. in viscosity. Solution modifiers, when utilized, are generally present in concentrations ranging up to about 10% of the polymer-solvent mix. Usually this concentration is from about 1 to 6%.

One method for increasing the selectivity of the outer barrier skin of the particles formed by the instant invention is to post-treat them in a bath at elevated temperatures. Typical after treatment temperatures will range from 50 to 90° C., although higher temperatures may be used to achieve the desired results with some polymers.

IN THE DRAWINGS

FIG. 1 is a schematic diagram of an apparatus useful in making particles according to the instant invention.

FIG. 2 is a schematic section of a microporous particle of the invention.

FIG. 3 is a schematic section of a particle of the invention having a non-porous barrier layer through which the flow must be substantially by chemically-activated diffusion processes.

FIG. 4 is an infra-red adsorption spectra curve of a mixture of materials coming out of a chromatographic column packed with the particles of the instant invention. Also shown on FIG. 4 is the infra-red curve of each individual component.

Referring to FIG. 1, illustrating a droplet forming device 9, it is seen that a polymer solution 10 is fed into a solution reservoir 12 and may thence enter a solution discharge conduit 15 in which conduit is situated a centrally-located wire 16. This wire 16 provides a stationary central nucleus on which drops of polymer solution can form. Around reservoir 12 is an air jacket 17 which provides means to blow a droplet 18 of polymer solution 10 off of wire 15 at the appropriate size. Drop size, and hence particle size, may be determined by adjusting rate of air-flow and rate of solution feed. Conduit 14 is suitably a hypodermic needle and the insertion of wire 16 therein allows droplet size to depend primarily on air velocity through jacket 17 rather than on the size of the orifice of conduit 14.

FIG. 2 shows a particle 31 according to the invention having a thin microporous barrier layer 30 comprising micropores 32. The inner volume of the particle consists of large and small void spaces 34 suitable for holding core material. A substantial internal support structure 36 provides a high compression resistant character to the membrane. This type of particle is highly versatile advantageous for use in a wide variety of processes.

FIG. 3 shows a particle 40 according to the invention having a thin barrier layer 42 which barrier layer is substantially free from pores but is subject to (1) diffusive transport phenomena, e.g. per Fickian diffusion and like processes or (2) to substantially no mass transport thereacross. In the latter case, of course, the core material is made available for its intended use by destruction of the barrier layer by some kind of physical or chemical attack. For example the use of shearing action of an agitator in a chemical reactor (e.g. a Banbury Mixer) or the use of stomach fluids, etc.

ILLUSTRATIVE EXAMPLES OF THE INVENTION

Included below are a number of examples of the process of the invention and the novel products produced thereby. Most of these examples are illustrative of particles having pore sizes in their barrier skins of between 10 and 500 millimicrons, i.e. the size most advantageous in slow-release encapsulation, in macromolecular separations, and in chemical modification processes wherein the process comprises the step of exposing a chemical compound to the action of another compound trapped within the particle itself. Although illustrative of the advance in the art achieved by the instant invention, it is expected that those skilled in polymer chemistry will, on the basis of these examples, be able to select appropriate polymers, solvents, solution modifiers, diluents, and core-materials to form microporous, internally reinforced particles appropriately balanced in chemical resistance, retentivity and flux characteristics to meet the requirements of any particular application.

Example 1

A 16% solution of a polysulfone-type polymer sold by the 3M Company under the trade designation Polymer 360 was prepared in DMSO at about 25° C. The solution was dyed red with a Turkey Red dye dissolved in heavy naphtha. The resulting dyed solution was added dropwise through a number 21 syringe needle into a water bath. Small (about 2 millimeters, average diameter) pink spheres were formed, allowed to leach for 12 hours in water at 25° C., and dried.

Two quantitatively-equal samples of spheres were then taken and tested as follows:

Samples 1 spheres were cut into approximate hemispheres and put into a known volume of naphtha. Sample 2 spheres were placed undamaged into an equal volume of naphtha. The naphtha holding Sample No. 1 turned bright red in a matter of about 5–8 hours. Sample No. 2 reached the same color intensity very slowly, i.e. not until about 120 hours. This indicates that the skin of the particles forms an effective time-release microporous barrier to the passage of the dye.

The same procedure has been found applicable to the agricultural arts for the slow release of plant nutrients, to the medical arts for the slow release of medicants, and to other areas wherein the slow release of materials is required, e.g. in the slow release of flavor components, fragrance components and other such substances which tend to be too-quickly lost to the environment in which it is desired to utilize their properties.

Example 2

The process as described in Example 1 was repeated excluding the dye and modifying the process so that the temperature of water diluent was about 100° C. The resulting particles were determined to have a largely hollow interior, the macroporous spongy material being largely confined to the interior volume proximate the very tight barrier layer.

Example 3

A solution of 41 grams Dynel was prepared in 130 cubic centimeters of DMF. The resultant solution was diluted with an equal volume of oil of wintergreen (methyl o-salicylate, molecular weight 152.14). This solution was then added dropwise from a number 21 syringe needle and at 25° C. into an aqueous solution of 20% NaCl and agitated therein at 25° C. for several hours.

The resulting particles or "beads" are hard, transparent and contain 76 weight percent of methyl o-salicylate.

Example 4

A quantity of 0.59 gram of catalase, an enzyme, was dissolved in 5.9 grams of water. To this was added 54 cubic centimeters of DMF to form a suitable solvent. Six grams of Dynel was dissolved in this solvent and the resulting Dynel solution was added dropwise to 2000 cc. of a water diluent bath which contained about 0.5 cc. of a surfactant sold under the trade designation Triton X-100 by Rohm and Haas. The resulting particles, about 2-3 mm. in average diameter, were swirled about in the bath for 4 hours during which time they became hard white spheres.

These spheres were put into a 3% aqueous solution of hydrogen peroxide. Evolution of gas bubbles was observed over a period of many hours. Thus it was clear that the enzyme was acting as a catalytic agent, trapped in the particle, to achieve the decomposition of hydrogen peroxide entering the particles. This decomposition is accomplished by the reaction $$2H_2O_2 \xrightarrow{\text{catalase}} O_2 + 2H_2O$$

The oxygen, of course, was able to escape through the barrier skin of the particles.

Because the enzyme is locked into the particles, the enzyme itself cannot escape. Therefore its effectiveness is prolonged. Such catalase-encapsulated material would have utility in a physiological system where unwanted hydrogen peroxide was forming and could be utilized without fear of the enzyme reaching parts of the system in which it could cause damage. One would be the use of such capsules in combatting radiation sickness.

Example 5

The following systems were utilized in forming particles with anisotropic barrier skins which particles were useful in obtaining separations of macromolecular materials when used as packing in "chromatographic columns."

Example 6

Two batches of spheres were prepared using a 6% Dynel solution in DMSO for the first batch and a 5% Dynel solution in DMSO for the second batch. Each batch of spheres was formed in aqueous diluent and each batch of spheres had an average particle diameter of about 2 milliliters. These batches were each placed in hollow columns 1.5 cm. in diameter and 15 centimeters in length. The columns were connected for sequential flow therethrough, the spheres formed of the 6% Dynel solution being in the upstream column.

Thereupon, a standard solution comprising

| | Parts by volume |
|---|---|
| Gamma globulin (H.S.) | 1 |
| Albumin | 1 |
| Ovalbumin | 1 |
| Phenylalanine | 1 |
| Cytochrome C | 1 |
| Phosphate Buffer (pH 7.4) | 95 |

| Polymer (percent sol.) | Solvent | Diluent bath | Particle form |
|---|---|---|---|
| (a) Polysulfone (10%) | DMF | Water-acetone | Hard white spheres of 2-3 mm. diameters. |
| (b) Dynel (10%) | DMSO | Water-soap | Do. |
| (c) Nomex [1] (5%) | DMF [2] | Water-Triton X-100 | Rougher skin than (a) or (b). |

[1] Tradename of an aromatic polyamide polymer fiber sold by E.I. Du Pont de Nemours and Co., Inc.
[2] Included 2.5% of lithium chloride.

was prepared and a sample of 0.5 ml. of this solution fed into the upstream colmn. Buffer solution (1 part 0.1 molar phosphate buffer and 9 parts of isotonic saline of pH 7.4) was circulated through the column at 12 milliliters per hour.

The material was analyzed by means of an ultra-violet spectrometer as it left the downstream column. Despite the very short length of column utilized and the relatively small "chromatographic" area available because of the relatively large size of spheres utilized, a substantial separation of gamma globulin and albumin was determined to have taken place. FIG. 4 shows the ultra-violet curve. Peak A represents gamma globulin, Peak B represents albumin.

Thus it is seen that the pore structure of the outer skin of the particles determnie the upper size limit of molecules which can penetrate the particle. The actual length of time a certain size molecule takes to pass through a given packed column is the sum of the time it would take it to pass through the column if it cannot penetrate the particle barrier layer plus the time it spends inside the particle if it can penetrate the barrier layer. Molecules which cannot penetrate the particles will have their velocity through the column determined only by the extra-particle volume within the column. The fact that the "extra" time spent in the column by materials that can penetrate the barrier skin will depend upon the size and diffusion properties allows the separating of such materials according to their size and diffusion properties. It is to be noted that these effects can be magnified greatly when the polymer from which the particles is formed is tailored to achieve a particular purpose. For example, the particles may be formed of ion exchange resins such as aminated polyvinyl chloride, polyelectrolyte complex resins having large excesses of anionic groups or cationic groups, or the like.

Example 7

Three grams of a polyacrylonitrile fiber sold under the trade designation Orlon by E. I. du Pont de Nemours, Inc. was dissolved in thirty grams of an aqueous solution comprising 70% by weight of zinc chloride. After the solution was cooled to about 25° C., 0.2 gram of the enzyme catalase was added to the solution. Thereupon, the solution was added dropwise through a No. 21 hypodermic needle into an acetone bath whereupon particles were formed. After being stirred for about thirty minutes in the acetone, the particles were removed and placed in a water bath for four hours at room temperature to leach out residual acetone and salt.

The residual particles, when immersed in a dilute $H_2O_2$ solution, within several hours became buoyed by oxygen being formed within and on the surface of the enzyme-encapsulating particles.

Example 8

The procedure of Example 3 was repeated except that the salt used as a modifier in the diluent was omitted and (instead) 10% by weight of NaCl was put into the polymer solution.

The resulting polymer particles were found to be more permeable than those formed in Example 3, allowing a more rapid egress of the oil of wintergreen from the particles.

What is claimed is:

1. A particle having an outer diameter from 10 microns to 0.25 inch comprising a continuous-phase solid organic film-forming polymer including an outer permeable microporous barrier layer from about 0.1 to 5 microns in thickness having a plurality of pores from 1 to 500 millimicrons in diameter and within said barrier layer a macroporous support structure, said macroporous support structure having an open porous structure providing a void volume equal to at least 25% of the total volume of the particle.

2. A particle as defined in claim 1 wherein the support structure is of sufficiently open porous structure that it provides no significant increase in resistance to hydraulic flow above that offered by the barrier layer.

3. A particle as defined in claim 2 wherein said void volume comprises a chemical reactant disposed therein.

4. A particle as defined in claim 3 wherein said reactant is an enzyme.

5. A particle as defined in claim 1 formed of a physiologically-tolerable polymer and wherein said void volume comprises a medicant of sufficiently small molecular size to pass through the micropores of said particle.

6. A particle as defined in claim 1 formed of a degradeable polymer substance and comprising a fertilizer in said void volume which fertilizer is of sufficiently small molecular size to be leached through said micropores.

7. A particle as defined in claim 1 wherein said void volume comprises a deodorant, a flavor-imparting compound, or a fragrance.

8. A particle as defined in claim 1 wherein said void volume comprises a reactive curing agent.

9. A particle as defined in claim 1 wherein said polymer absorbs less than 10% moisture at 100% humidity and 25° C. and has a glass transition temperature above about 20° C.

10. A process for making microporous, fluid permeable polymer particles, comprising the steps of
    (1) forming a solution containing a film forming organic polymer in a liquid solvent
    (2) forming droplets of said solution
    (3) contacting said droplets with a diluent characterized by a high degree of compatibility with said solvent and a sufficiently low degree of compatibility with said polymer solution to effect precipitation of said polymer therefrom immediately on contact therewith and
    (4) maintaining said diluent in contact wih said particle until substantially all said solvent has been replaced with said diluent.

11. A process as defined in claim 10 wherein said polymer is selected from the group consisting of a polycarbonate polyvinyl chloride, a copolymer of acrylonitrile and polyvinylchloride, a polysulfone, polymethylmethacrylate, and poly(n-butylmethacrylate) wherein said solvent is selected from dimethyl formamide, dimethylsulfoxide, dimethylacetamide, N'N'-diethylformamide, diethylpropionamide, n-butyrolactone, ethylene carbonate, tetra-hydrothiophene, dimethylpropionamide, cyclohexanone, n-methyl pyrrolidone, tetrahydrofuran and dioxane, mixtures of at least one of the foregoing solvents with non-polar solvent ethers; mixtures of at least one of the foregoing solvents with alkyl ketones having less than four carbon atoms, and mixtures of at least two of the foregoing solvents.

12. A process as defined in claim 11 wherein said diluent is selected from the group consisting of water, a mixture of water and at least one organic solvent, and a solution of an inorganic salt in water.

13. A process as defined in claim 10 wherein said solvent is comprised of at least one organic solvent.

14. A process as defined in claim 10 wherein said solvent is a solution of at least one inorganic salt in water.

15. A process as defined in claim 10 wherein said solvent is a solution of an inorganic compound in an organic solvent.

16. A process as defined in claim 10 wherein said solvent is a solution of a highly water-compatible organic compound in an organic solvent.

17. A process as defined in claim 10 wherein said diluent comprises water.

18. A process as defined in claim 17 wherein said diluent comprises additionally an inorganic salt, thereby promoting the formation of a barrier layer of relatively low permeability.

19. A process as defined in claim 17 wherein said diluent comprises additionally an organic compound of very high water-compatibility thereby promoting the formulation of a particle of relatively low permeability.

20. A process as defined in claim 17 wherein said diluent comprises additionally a water-miscible organic compound thereby promoting the formation of a particle of relatively high permeability.

References Cited

UNITED STATES PATENTS

| | | | |
|---|---|---|---|
| 3,018,257 | 1/1962 | Spencer | 260—2.5 B |
| 3,117,941 | 1/1964 | Knobloch et al. | 260—2.5 B |
| 3,418,250 | 12/1968 | Vassiliades | 117—36.2 |
| 3,418,656 | 12/1968 | Vassilliades | 117—36.2 |

MURRAY TILLMAN, Primary Examiner

M. FOELAK, Assistant Examiner

U.S. Cl. X.R.

21—55; 71—64 F, 64 G, 64 SC; 99—140 R, 166; 117—36.2; 195—63; 252—316, 522; 260—30.2, 30.4 R, 30.4 N, 30.8 R, 30.8 DS, 31.2 R, 31.2 N, 31.8 R, 31.8 A, 31.8 Z, 31.8 AN, 32.2 R, 32.6 R, 32.6 N, 32.8 R, 32.8 N

UNITED STATES PATENT OFFICE
CERTIFICATE OF CORRECTION

Patent No. 3,639,306            Dated February 1, 1972

Inventor(s) Shmuel Sternberg et al.

It is certified that error appears in the above-identified patent and that said Letters Patent are hereby corrected as shown below:

Column 3, line 48, change "thaving" to --having--;

Column 4, line 50, change "or" to --of--;

Column 4, line 68, change "polyester" to --polyesters--;

Column 6, line 75, change "solving" to --solvating--;

Column 9, line 42, change "Samples" to --Sample--;

Column 11, line 16, change "determnie" to --determine--;

Column 13, lines 1 and 2, Claim 19, change "formulation" to --formation--.

Signed and sealed this 5th day of September 1972.

(SEAL)
Attest:

EDWARD M. FLETCHER, JR.           ROBERT GOTTSCHALK
Attesting Officer                 Commissioner of Patents